US012759250B2

(12) United States Patent
De Col et al.

(10) Patent No.: US 12,759,250 B2
(45) Date of Patent: Oct. 13, 2026

(54) GRIPPING METHOD AND APPARATUS FOR ANNULAR COMPONENTS OF TYRES FOR VEHICLE WHEELS

(71) Applicant: Pirelli Tyre S.p.A., Milan (IT)

(72) Inventors: Christian De Col, Milan (IT); Stefano Rosario Mervic, Milan (IT); Marco Cantu', Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 19/181,104

(22) Filed: Apr. 16, 2025

(65) Prior Publication Data

US 2026/0145399 A1 May 28, 2026

Related U.S. Application Data

(63) Continuation of application No. 18/256,878, filed as application No. PCT/IB2021/061761 on Dec. 15, 2021, now Pat. No. 12,296,550.

(30) Foreign Application Priority Data

Dec. 17, 2020 (IT) ........................ 102020000031199

(51) Int. Cl.
*B29D 30/00* (2006.01)
*B29D 30/26* (2006.01)

(52) U.S. Cl.
CPC ..... *B29D 30/0016* (2013.01); *B29D 30/2607* (2013.01); *B29D 2030/0022* (2013.01)

(58) Field of Classification Search
CPC .. B29D 30/0016; B29D 30/24; B29D 30/246; B29D 30/26; B29D 30/2607;
(Continued)

(56) References Cited

U.S. PATENT DOCUMENTS 5,156,713 A 10/1992 Ishii et al.
2017/0239900 A1 8/2017 Morioka

FOREIGN PATENT DOCUMENTS

CN 101172401 A 5/2008
CN 103144331 A 6/2013
(Continued)

OTHER PUBLICATIONS

Shin Sam Hwan, KR-101410724-B1, machine translation. (Year: 2014).*
(Continued)

*Primary Examiner* — Sedef E Paquette
(74) *Attorney, Agent, or Firm* — Finnegan, Henderson, Farabow, Garrett & Dunner, L.L.P.

(57) ABSTRACT

After a support structure (12) has been circumferentially positioned around an annular component (11) of a tyre (2), gripping elements (16) carried by the support structure (12) and circumferentially distributed around a central axis (X) are radially approached to the annular component (11) bringing into contact therewith a plurality of feeler pins (22), slidably carried by each of said gripping elements (16). Once contact is made, the radially approaching of the gripping elements (16) to the annular component (11) continues by sliding the gripping elements themselves along the feeler pins (22). All the feeler pins (22) can therefore come into contact with the annular component (11), copying the shape of the outer surface. The feeler pins (22) are then locked with respect to the gripping elements (16) in order to allow the removal of a support drum (10) from the annular component (11) and support the latter in the absence of normal stresses.

20 Claims, 7 Drawing Sheets

(58) Field of Classification Search
CPC .... B29D 2030/0022; B29D 2030/0038; B29D 2030/2642; B29D 2030/265; B29D 2030/2657
USPC ............................................ 156/110.1, 111
See application file for complete search history.

(56) References Cited

FOREIGN PATENT DOCUMENTS

| | | | | |
|---|---|---|---|---|
| CN | 103171164 | A | 6/2013 | |
| CN | 103434164 | A | 12/2013 | |
| CN | 106142613 | A | 11/2016 | |
| CN | 207059269 | U | 3/2018 | |
| CN | 109263098 | A | 1/2019 | |
| CN | 109263100 | A | 1/2019 | |
| EP | 0326365 | A1 | 8/1989 | |
| JP | 2009248498 | A | 10/2009 | |
| JP | 2018047585 | A | 3/2018 | |
| KR | 101410724 | B1 * | 6/2014 | ............ B29D 30/20 |
| KR | 101970407 | B1 | 4/2019 | |
| KR | 20200042094 | A | 5/2020 | |
| KR | 20200050168 | A | 5/2020 | |
| WO | 2018109392 | A1 | 6/2018 | |

OTHER PUBLICATIONS

International Search Report form the European Patent Office in corresponding International Application No. PCT/ IB2021/061761 mailed Apr. 14, 2022.

Written Opinion of the International Searching Authority from the European Patent Office in corresponding International Application No. PCT/IB2021/061761 mailed Apr. 14, 2022.

Notification of the First Office Action issued by the China National Intellectual Property Administration on Jan. 27, 2024, in corresponding Application No. CN 201880083003.4 (6 pages).

* cited by examiner

GRIPPING METHOD AND APPARATUS FOR ANNULAR COMPONENTS OF TYRES FOR VEHICLE WHEELS

This application is a continuation application of U.S. application Ser. No. 18/256,878, filed Jun. 9, 2023, which is a national stage entry application under 35 U.S.C. § 371 of International Application No. PCT/IB2021/061761, filed on Dec. 15, 2021, and claims priority to Italian Application No. 102020000031199, filed Dec. 17, 2020; the contents of each application is incorporated herein by reference in its entirety.

The present invention relates to a gripping method and apparatus for annular components of tyres for vehicle wheels. More particularly, the invention is mainly directed towards the building of green tyres, to be subsequently subjected to a vulcanisation cycle for obtaining the final product.

A tyre for vehicle wheels generally comprises a carcass structure comprising at least one carcass ply respectively having opposite ends engaged with respective anchoring annular structures (bead cores), integrated in the zones normally identified with the name "beads", having an internal diameter substantially corresponding to a so-called "fitting diameter" of the tyre on a respective mounting rim.

The carcass structure is associated with a crown structure which can comprise one or more belt layers, situated radially superimposed on each other and with respect to the carcass ply, having textile or metallic reinforcement cords with cross orientation and/or substantially parallel to the circumferential extension direction of the tyre (at 0 degrees). In radially outer position with respect to the belt layers, a tread band is applied, it too made of elastomeric material like other semi-finished products constituting the tyre.

Respective sidewalls made of elastomeric material are also applied in axially outer position on the lateral surfaces of the carcass structure, each extended from one of the lateral edges of the tread band up to the respective anchoring annular structure with the beads. In the tyres of "tubeless" type, an air-impermeable coating layer, usually termed "liner", covers the inner surfaces of the tyre.

Following the building of the green tyre actuated by assembly of respective components, a moulding and vulcanisation treatment is generally executed aimed to determine the structural stabilisation of the tyre by cross-linking of the elastomeric compositions as well to impart on the same, if requested, a desired tread pattern and possible distinctive graphic marks at the sidewalls.

The terms "radial" and "axial" and the expressions "radially inner/outer" and "axially inner/outer" are used with reference to the radial direction of the annular body of a used support structure and/or of an annular component of a tyre (i.e. to a direction perpendicular to a central axis of the annular body and/or to the rotation axis of the aforesaid tyre) and to the axial direction of the annular body and/or of the tyre (i.e. to a direction parallel to the central axis or to the rotation axis of the tyre). The terms "circumferential" and "circumferentially" are instead used with reference to the annular extension of the aforesaid annular support and/or annular component of a tyre. By "annular component" of a tyre, it is intended a green tyre or any one component thereof shaped as a ring around a central axis coinciding with the rotation axis of the tyre itself. Annular components for example include the carcass ply/plies, the bead cores, the tread band, the belt layer/layers, the tread band, the sidewalls, as well as a set composed of two or more of such components that are mutually coupled, such as for example the carcass structure comprising at least one carcass ply associated with the bead cores, and the crown structure comprising at least one or more belt layers and the tread band. By "feeler pin" it is intended an abutment element projecting from a gripping element and movable with respect to the gripping element in order to be abutted against a surface of an annular component while the gripping element translates towards the latter.

During the process of building a tyre, one or more of its annular components must be picked up and suitably retained for the purpose of transfer into different work stations and/or for the coupling with other tyre parts. For example the carcass structure, typically made in cylindrical sleeve form, and the crown structure are generally made separately from each other in respective work areas, in order to be mutually assembled at a later time. For the purpose of the mutual assembly, it may be requested that one of these, for example the crown structure, be picked up from a respective forming drum, in order to be transferred and positioned coaxially centred around the carcass structure, supported by a respective building drum. Hence, gripping apparatuses are normally applied in a production line, which are suitable for performing the operations of picking up, support and positioning of the crown structure, of the carcass structure and/or of other annular components, for the purpose of their coupling with other parts of the tyre being processed.

The document CN109263098 describes a gripping apparatus which comprises an annular body arranged on a base reciprocally movable along a slide guide; the annular body is provided with telescopic mechanisms comprising blocks for magnetic attraction of a tyre body and locking cylinders; the magnetic attraction blocks are connected in a fixed manner with connecting rods of the locking cylinders; the connecting rods are aligned with the centre of the annular body.

The document CN207059269U describes a control system with self-adaptive gripping having a ring situated on a machine for tyre construction, comprising electric servo-cylinders, for driving the movement of plates carrying load cells connected to a PLC. The PLC detects the feedback of the tightening force from the load cells and interrupts the actuation of the electric servo-cylinders upon reaching a nominal tightening force.

The Applicant has nevertheless observed that the apparatuses of the type for example described in the aforesaid documents are not adapted for offering a satisfactory gripping action on annular components having geometric and/or size characteristics that are different from those dictated by the design specifications, based on which the apparatuses themselves are constructed. In particular, the Applicant has perceived that when the known apparatuses are used for handling annular components having size and/or geometric characteristics different from those for which they were built, the action on the annular component being processed by the elements set to come into contact therewith does not result distributed and/or applied in a sufficiently appropriate manner, with the consequent tendency to cause twisting or deformations on the component itself, which can negatively affect the coupling precision with other parts of the tyre being processed and, consequently, on the quality of the final product.

This circumstance makes it difficult to use the known apparatuses in production lines where for example it can be requested to build small batches of tyres having dimensions and/or geometric characteristics that are different from each other, especially where the production requirements impose maximum quality standards, as takes place for example in the production of tyres for ultra-high performance vehicles or intended for use in sports competitions.

Consequently, each time it is necessary to process tyres that require annular components with different geometric and/or size characteristics, at the present state of the art it is necessary to intervene on the gripping apparatuses in order to substitute and/or make the necessary adjustments of the elements set for contacting the annular components of the tyres being processed, with consequent production losses deriving from the processing down times necessary for the setting.

The Applicant has therefore identified the opportunity to simplify the production processes by reducing or cancelling the setting operations for the apparatuses for gripping the annular components.

More particularly, the Applicant has perceived that in order to be able to manage the production of tyres having technical specifications that are different from each other, it is convenient to arrange gripping apparatuses that are capable of being autonomously adapted to the geometric and/or size characteristics of the annular components being processed at each production cycle, thus also managing a plurality of "single batches", i.e. batches formed by single tyres that are different from each other.

The Applicant has finally found that, by arranging gripping elements conceived such that the physical contact on the annular component itself is entrusted to the distributed action of a plurality of feeler pins that are separately positionable so as to copy the shape thereof, the gripping action is spontaneously adapted to the geometric and/or size characteristics of each annular component being processed.

In accordance with one aspect, the invention relates to gripping method for annular components of tyres for vehicle wheels.

Preferably, provision is made for positioning a support structure circumferentially around an annular component of a tyre.

Preferably, provision is made for radially approaching the annular component gripping elements carried by the support structure and circumferentially distributed around a central axis, bringing into contact on the annular component a plurality of feeler pins slidably carried by each of said gripping elements.

Preferably, provision is made for continuing the radially approaching of the gripping elements to the annular component, making them slide along the feeler pins which came into contact with the annular component until the gripping elements reach a gripping position.

Preferably, provision is made for locking the feeler pins with respect to the gripping elements.

In accordance with a further aspect, the invention relates to gripping apparatus for annular components of tyres for vehicle wheels.

Preferably, provision is made for a support structure arranged circumferentially around a central axis.

Preferably, provision is made for a plurality of gripping elements carried by the support structure and circumferentially distributed around said central axis.

Preferably, the gripping elements are radially movable, each between a gripping position in which the gripping element is approached to the central axis to retain at least one annular component, and a release position in which the gripping element is moved away from the central axis for releasing said annular component. Preferably, each gripping element has a plate-like body.

Preferably, each gripping element has a plurality of feeler pins radially movable through the plate-like body between an extracted position in which it protrudes radially towards the central axis and a retracted position in which they are retracted away from the central axis.

Preferably, each gripping element has at least one brake operating between the plate-like body and the feeler pins, and selectively activatable for locking the feeler pins in an intermediate working position between extracted position and the retracted position.

The Applicant deems that by engaging the annular component by feeler pins movable with respect to the gripping elements and lockable against the annular component itself, a spontaneous adaptation is allowed of the shaping of the gripping elements to the geometric characteristics of the component itself, facilitating a more precise and stable engagement of the latter for the purpose of its movement and/or transfer in the absence of deformations. It is also possible to engage, in an equally facilitated and safe manner, annular components having different diameters from each other, and/or whose radially outer surfaces have a cross sectional profile different from each other, without having to intervene on the gripping apparatus with substitutions and adjustments of parts in order to adapt it each time to different shaping and/or dimensions of the annular components themselves.

In at least one of the aforesaid aspects, convenient embodiments of the invention can comprise one or more of the following preferred characteristics.

Preferably, the feeler pins locked with respect to the gripping elements each have their own distal end acting in contact against the annular component.

The sum of the actions of the distal ends of the feeler pins facilitates an effective retention of the annular component, uniformly distributing the stresses on the latter, minimizing localized tensions and consequent possible deformations.

Preferably, the distal ends each act against a radially outer surface of the annular component.

Preferably, the distal ends project with respect to the gripping elements in radially inner position.

Preferably, each feeler pin comes into contact with the annular component by a respective distal end opposite a proximal portion slidably engaged with the respective gripping element Preferably, at least before the radially approaching, the feeler pins are elastically pushed towards the central axis.

The elastic thrust action on the feeler pins allows bringing the same back into the position projecting from the respective gripping elements in order to arrange them in contact with the annular component.

Preferably, the locking of the feeler pins with respect to the gripping elements takes place by frictional forces.

It is thus possible to lock each feeler pin in any position along a sliding direction thereof with respect to the gripping element.

Preferably, the frictional forces are produced by pushing brake inserts against the feeler pins.

Preferably, the brake inserts are pushed against each feeler pin transversely to a sliding direction of the feeler pin with respect to the gripping element.

Preferably, the feeler pins are guided with respect to the gripping elements each along a sliding direction parallel to a radial approach direction of the gripping element with respect to the central axis.

Preferably, provision is also made for magnetically retaining the annular component against the feeler pins.

An effective retention of annular components comprising metallic inserts is thus facilitated, even if said components should have a particularly limited structural consistency.

Preferably, during the positioning of the support structure the annular component is supported by a removable support drum. The support offered by the support drum prevents uncontrolled sliding of the feeler pins with respect to the gripping elements during the continuation of the approaching, under the effect of the weight of the annular component.

Preferably, the support drum is removed from the annular component after the locking of the feeler pins with respect to the gripping elements.

Preferably, after removing the support drum, the action of inserting, in the annular component, an additional drum is actuated, such additional drum having a cross sectional profile different that of the support drum.

Preferably, after the removal of the support drum, the action of releasing the feeler pins with respect to the gripping elements is actuated.

Preferably, after the removal of the support drum, the action of expanding the additional drum to cause a radial expansion of the annular component is actuated.

Preferably, after the removal of the support drum, the action of translating the feeler pins radially with respect to the gripping elements to accommodate the radial expansion of the annular component, during the expansion of the additional drum is actuated.

Preferably, after the removal of the support drum, the action of locking the feeler pins again with respect to the gripping elements at the end of the radial expansion of the annular component is actuated.

Preferably, after the removal of the support drum, the action of removing the additional drum from the annular component is actuated.

It is therefore possible to shape the annular component according to desired geometric specifications, while the sliding of the feeler pins supports the deformations thereof in a controlled manner.

Preferably, before releasing the feeler pins, a preliminary expansion of the additional drum is actuated up to bringing an outer surface thereof in contact with an inner surface of the annular component.

The additional drum is therefore adapted to support the annular component, so as to prevent uncontrolled sliding of the feeler pins with respect to the gripping elements with releasing completed, due to the weight of the annular component.

Preferably, each feeler pin has a proximal portion slidably engaged with the plate-like body and a distal portion projecting in radially inner position from the plate-like body.

The projection of the distal portions ensures that the action of the gripping elements on the annular component takes place through the feeler pins.

Preferably, the gripping elements are movable simultaneously upon command of a ring nut rotatably carried by the support structure and actuatable in rotation around the central axis.

The synchronous movement of the gripping elements is thus obtained by a single command operating on the ring nut, facilitating an overall structural simplification.

Preferably, the ring nut engages a plurality of toothed pinions each of which rotatably engaged with the support structure and carries a cam constrained to a drive lever of one of the gripping elements.

Preferably, the feeler pins are movable radially with respect to the plate-like body, independently of each other.

An independent mobility of the feeler pins facilitates a uniform distribution of the stresses on the annular component being processed.

Preferably, each feeler pin has a shaping elongated along a respective radial movement direction.

A wide adaptability of the apparatus to the different shapes and sizes of the annular components being processed is thus facilitated.

Preferably, the plate-like body of each gripping element comprises a first plate and a second plate superimposed parallel to each other.

Preferably, each of the feeler pins is slidably engaged through the first plate and the second plate.

Preferably, the first plate carries through holes slidably crossed, each by one of the feeler pins.

Preferably, each feeler pin has at least one abutment shoulder acting against an edge of the respective through hole in the extracted position.

It is thus possible to arrange a precise mechanical reference for the positioning of the feeler pins in extracted position.

Preferably, the second plate has sliding seats, each slidably housing a proximal portion of one of the feeler pins.

Preferably, provision is also made for elastic elements for elastically pushing each feeler pin towards the respective extracted position.

Preferably, the elastic elements operate each within one of the sliding seats.

Preferably, provision is also made for an intermediate plate operatively arranged between the first plate and the second plate and having guide channels slidably crossed, each by one of said feeler pins.

Preferably, the intermediate plate mates with the first plate.

Preferably, the brake comprises one or more brake inserts activatable in thrusting relation against each of the feeler pins.

Preferably, each brake insert is made of elastomeric material.

Preferably, each brake insert circumscribes at least one of the feeler pins at a through opening crossed by the feeler pin itself.

Preferably, the brake inserts are fixed to at least one actuation plate movable upon command of at least one thrust actuator to push the brake inserts against the feeler pins.

Preferably, provision is also made for two actuation plates mutually adjacent to each other and movable in respectively opposite directions to compress the brake inserts against the feeler pins.

The cooperation of the actuation plates therefore exerts a gripping action by means of opposite forces on each of the feeler pins.

Preferably, said at least one actuation plate has guide slots crossed by centring pins fixed with respect to the first and second plate.

Preferably, provision is also made for containment seats obtained on mutually facing surfaces of the actuation plates.

Preferably, each containment seat houses one of the brake inserts.

Preferably, each of the containment seats has a shaping complementary to that of the respective brake insert, so as to house it in substantial absence of mechanical clearance.

Preferably, said at least one thrust actuator operates between thrust flanges respectively carried each by one of the actuation plates.

Preferably, said at least one actuation plate is slidably engaged between the intermediate plate and one of said first and second plate.

Preferably, said at least one actuation plate is slidably engaged between the intermediate plate and the second plate.

Preferably, the thrust actuator comprises a plurality of fluid-dynamic cylinders interconnected in series one after the other.

It is therefore possible to sum the forces exerted on the thrust plates by each fluid-dynamic cylinder, in order to develop a high braking force without necessarily having to employ high supply pressures of the actuators.

Preferably, provision is also made for magnets operatively associated with the feeler pins.

Preferably, each of the magnets is carried by a distal end of one of the feeler pins.

The action of the magnets allows exploiting the presence of metallic inserts in the annular components, facilitating the manipulation thereof, even in cases in which their structural consistency is low.

Further characteristics and advantages will be clearer from the detailed description of a preferred but non-exclusive embodiment of a gripping method for annular components of tyres for vehicle wheels, and of a gripping apparatus conveniently usable for operating according to said method, in accordance with the present invention.

Such description will be set forth hereinbelow with reference to the enclosed drawings, provided only as a non-limiting example, in which.

Figure 10:
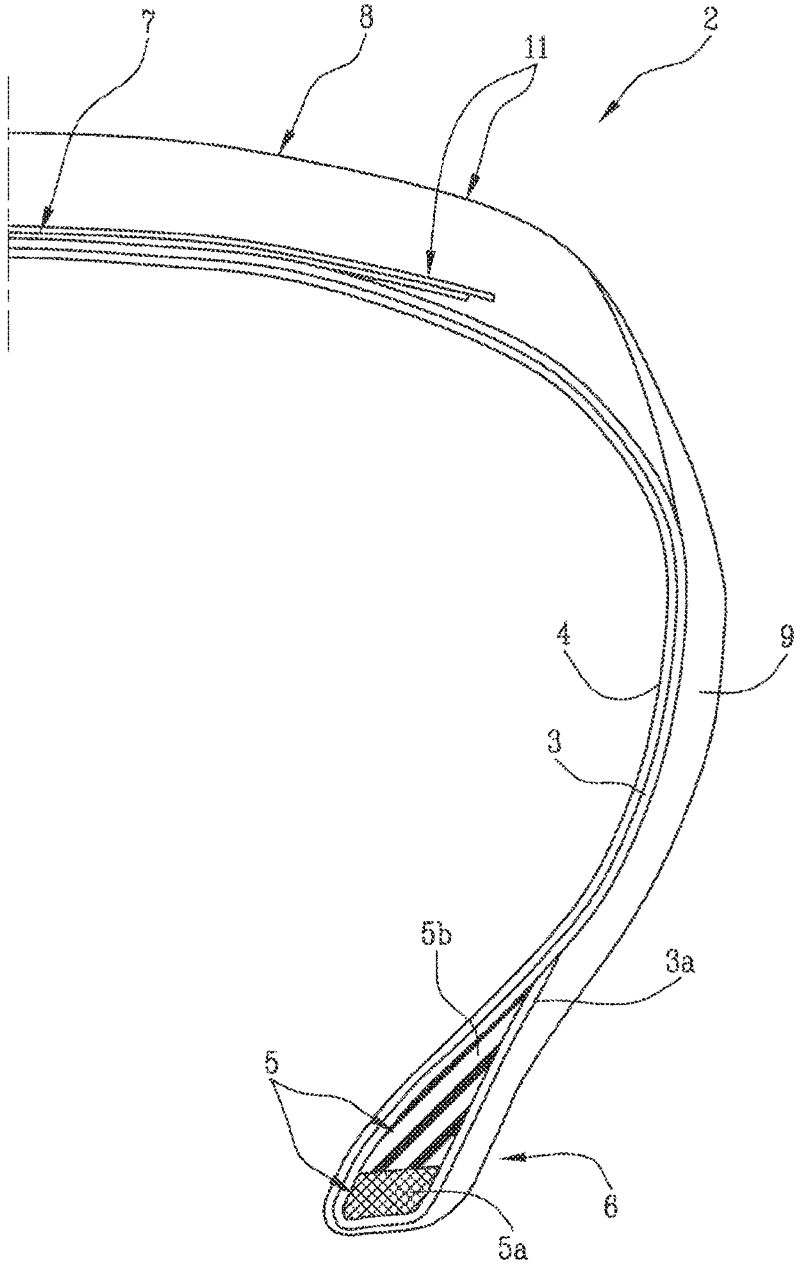

FIG. 10 schematically shows in radial half-section a tyre attainable in accordance with the present invention.

With reference to the abovementioned figures, reference number 1 overall indicated a gripping apparatus for annular components of tyres for vehicle wheels. The apparatus 1 is adapted for operating according to a gripping method for annular components of tyres for vehicle wheels in accordance with the present invention.

The apparatus 1 and the method actuatable thereby are conveniently usable in making tyres 2 (FIG. 10) typically comprising at least one carcass ply 3 preferably internally covered by an impermeable layer of elastomeric material or so-called liner 4. Two anchoring annular structures 5, each comprising a so-called bead core **5*a* preferably carrying an elastomeric filler 5*b* in radially outer position, are engaged with respective terminal flaps 3*a* of the carcass ply/plies 3. The anchoring annular structures 5 are integrated in proximity to zones normally identified with the name of "beads" 6, at which the engagement between the tyre 2** and a respective mounting rim (not depicted) usually takes place.

A belt structure 7 is circumferentially applied around the carcass ply/plies 3, and a tread band 8 is circumferentially superimposed on the belt structure 7. Two sidewalls 9, each extended from the corresponding bead 6 to a corresponding lateral edge of the tread band 8, are applied in laterally opposite positions on the carcass ply/plies 3.

For the purpose of attaining the tyre 1, provision can be made for, e.g. according to known modes, making a carcass sleeve (not illustrated) having shaping substantially cylindrical, comprising said at least one carcass ply 3, preferably internally covered by the liner 4. If necessary, the carcass sleeve can also comprise the sidewalls 9 or first portions thereof, each extended starting from a respective bead 6. The attainment of the carcass sleeve can for example be executed on a first support drum (not illustrated), usually identified as "building drum", on which the aforesaid components are formed and/or assembled according to a predetermined sequence.

On a further support drum, identified herein as "auxiliary drum" 10, a so-called crown structure 11 can be obtained, comprising the belt structure 7, possibly coupled with the tread band 8 and/or annular inserts of another type.

The crown structure 11 and the carcass sleeve are adapted to be mutually assembled in an assembly station (not illustrated) in which the carcass sleeve, typically supported by the same building drum in which it was attained or by a shaping drum on which it has been previously transferred, is radially expanded and toroidally shaped in order to be coupled with the crown structure 11 previously transferred into an axially centred position around the same carcass sleeve.

In the embodiment described hereinbelow, the apparatus 1 is adapted to be used for picking up the crown structure 11 from the auxiliary drum 10 and transferring it around the carcass sleeve arranged in the assembly station. In addition or as an alternative, the apparatus 1 is nevertheless conveniently usable, for example, for transferring the carcass sleeve from the building drum to the possible shaping drum, and/or for removing the assembled tyre 2 from the building drum and/or shaping drum, as well as for picking up any other annular component of a tyre 2 from a respective support drum during the production process.

The apparatus 1 comprises a support structure 12 arranged circumferentially around a central axis X. In the illustrated embodiment, the support structure 12 has a base 13 carrying an annular body 14 concentric with the central axis X. The base 13 can be slidably mounted on one or more linear guides 15, in order to allow the translation of the support structure 12 parallel to the central axis X. For example, the support structure 12 can be movable between a pick-up position in which, as in FIG. 7, it is preferably arranged in axially centred position around the auxiliary drum 10 carrying the crown structure 11, and a release position (not illustrated) in which it is axially moved away from the auxiliary drum 10 and preferably arranged in axially centred position around the carcass sleeve carried by the building drum or by the possible shaping drum, in order to allow the coupling thereof with the crown structure 11. The support structure 12 is associated with a plurality of gripping elements 16 carried by the annular body 14 and circumferentially distributed around the central axis X. Each of the gripping elements 16 is radially movable between a gripping position in which it is approached to the central axis X, and a release position in which it is moved away from the central axis X.

The movement of the gripping elements 16 is preferably controlled by a toothed ring nut 17 rotatably carried by the annular body 14 and carrying a circumferential toothing 17*a* which engages a plurality of toothed pinions 18*a* (FIGS. 7 to 9), each carried by a pin 18 rotatably engaged with the annular body 14 of the support structure 12. Each toothed pinion 18*a*, or the pin 18 associated therewith, carries a cam 19 constrained to a drive lever 20 of one of the gripping elements 16.

The toothed ring nut 17 is actuatable in angular rotation around the central axis X, for example upon action of a drive actuator (not illustrated) fixed to the base 13, to cause—through the aforesaid toothed pinions 18*a*—the simultaneous translation of all the gripping elements 16 between the gripping position and the release position. Alternatively, the movement of the gripping elements 16 can be obtained by levers associated with the annular body 14 and activatable by the drive actuator, or by a plurality of actuators each operating on one of the same gripping elements 16.

Figure 4:
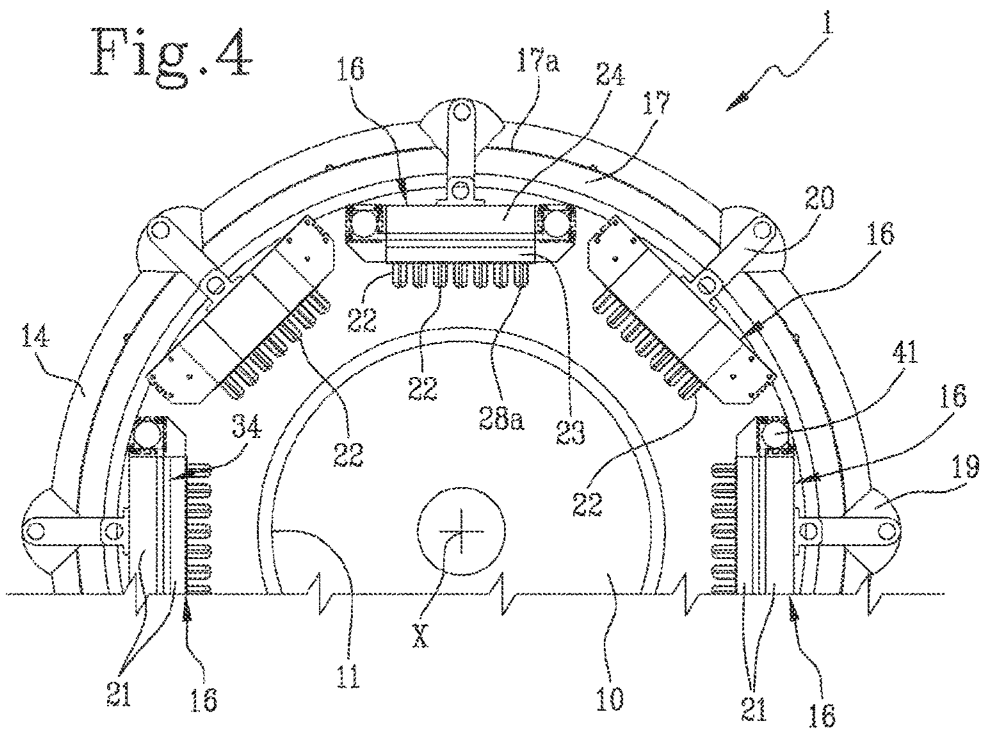
FIG. 4 is an interrupted front view showing the gripping elements of the apparatus, in release position with respect to a belt structure carried by an auxiliary drum.
Figure 5:
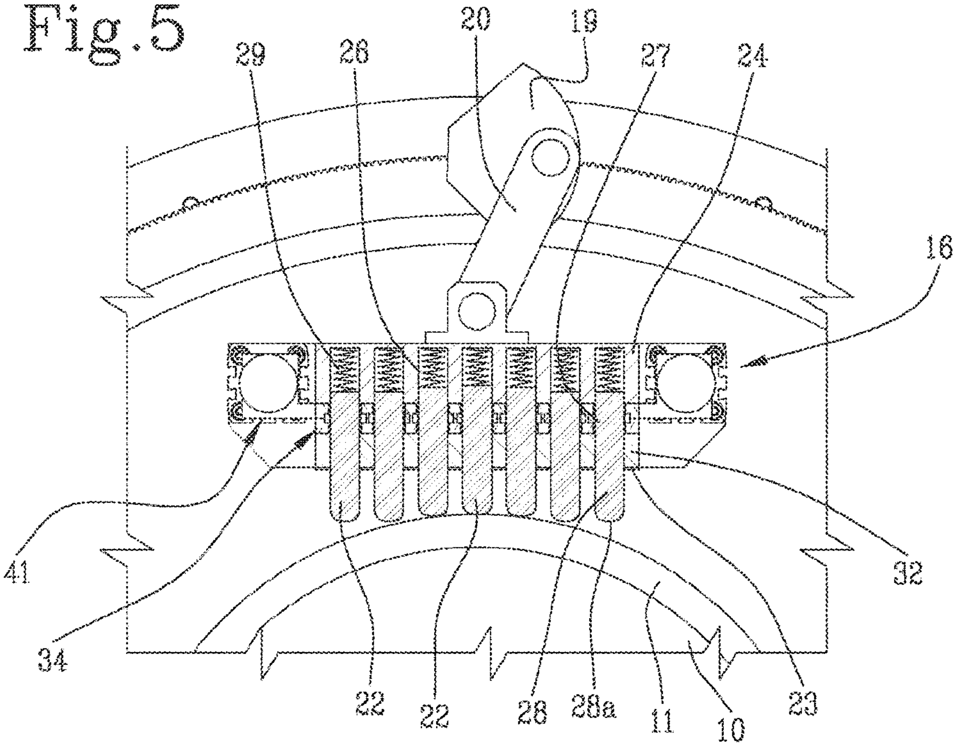
FIG. 5 shows in section one of the gripping elements of FIG. 4, during the movement towards a gripping position.
Figure 7:
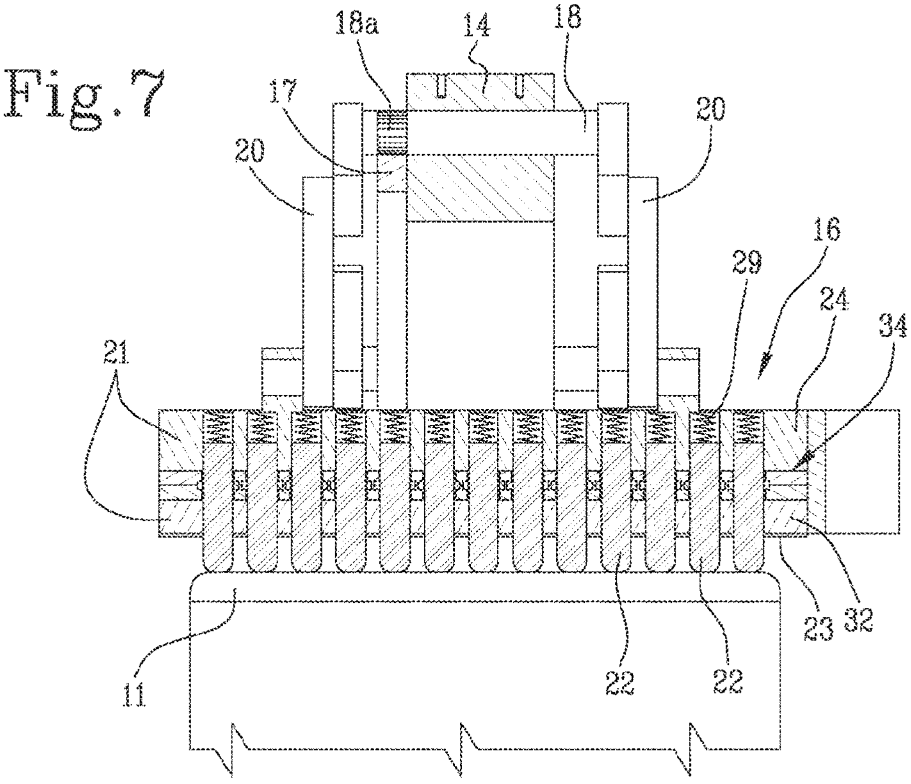
FIG. 7 shows in longitudinal section a detail of the gripping apparatus with the crown structure retained by the gripping elements, without the auxiliary drum.

Each of the gripping elements 16 has a plate-like body 21 facing towards the central axis X, slidably crossed by a plurality of feeler pins 22 distributed for example according to rows and parallel lines, or according to any one other matrix scheme. The feeler pins 22 are movable radially through the plate-like body 21, independently of each other, between an extracted position in which protrude radially towards the central axis X (FIG. 4) and a retracted position moving away from the central axis X (FIG. 7). The feeler pins 22 could also have a different length so as to be able to follow the circumference of the annular component. In this case the central feeler pins would be shorter and the length could increase incrementally for each row of feeler pins 22 towards the ends of the gripping element 16.

Figure 1:
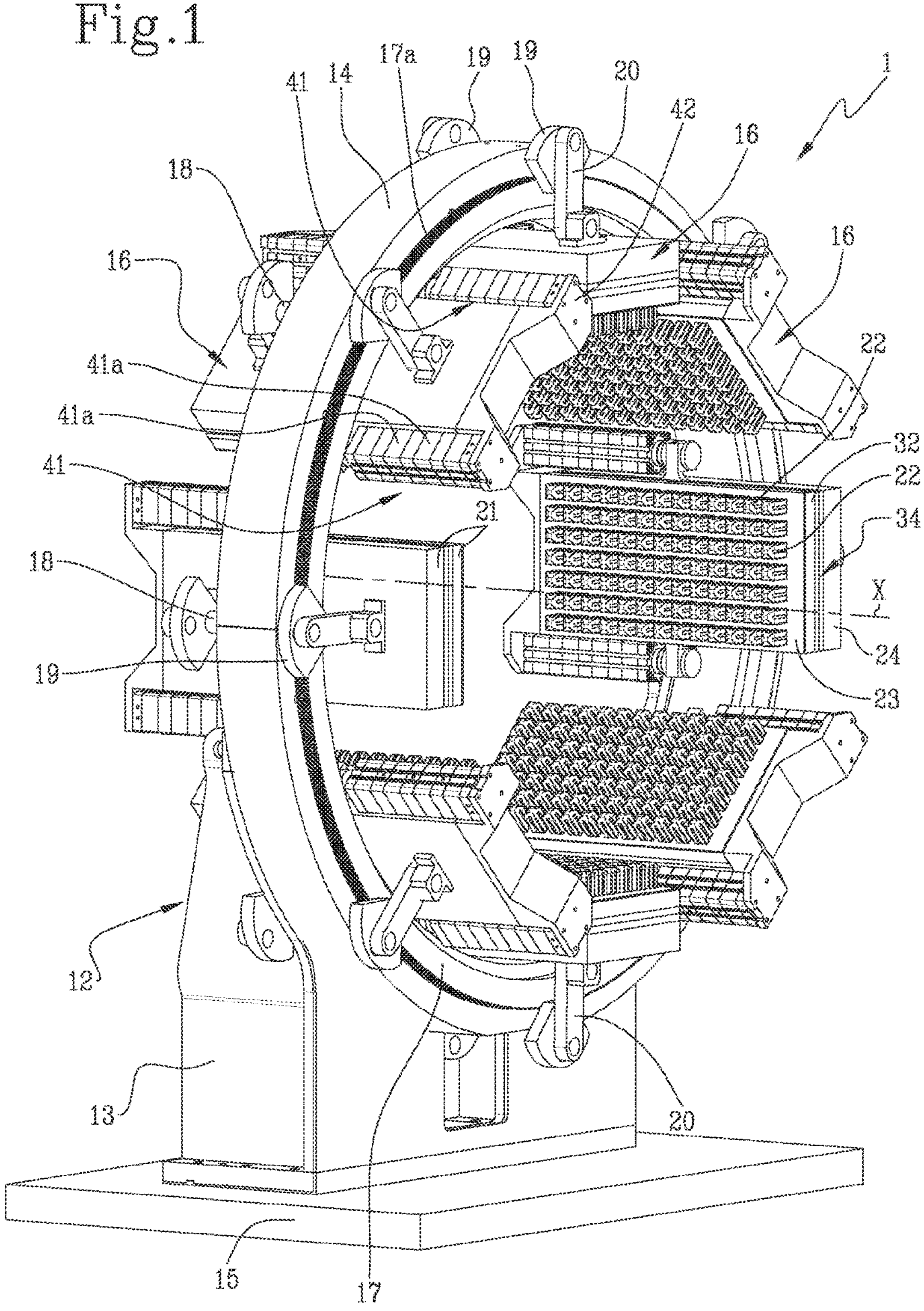
FIG. 1 shows in perspective view a gripping apparatus according to the present invention.
Figure 2:
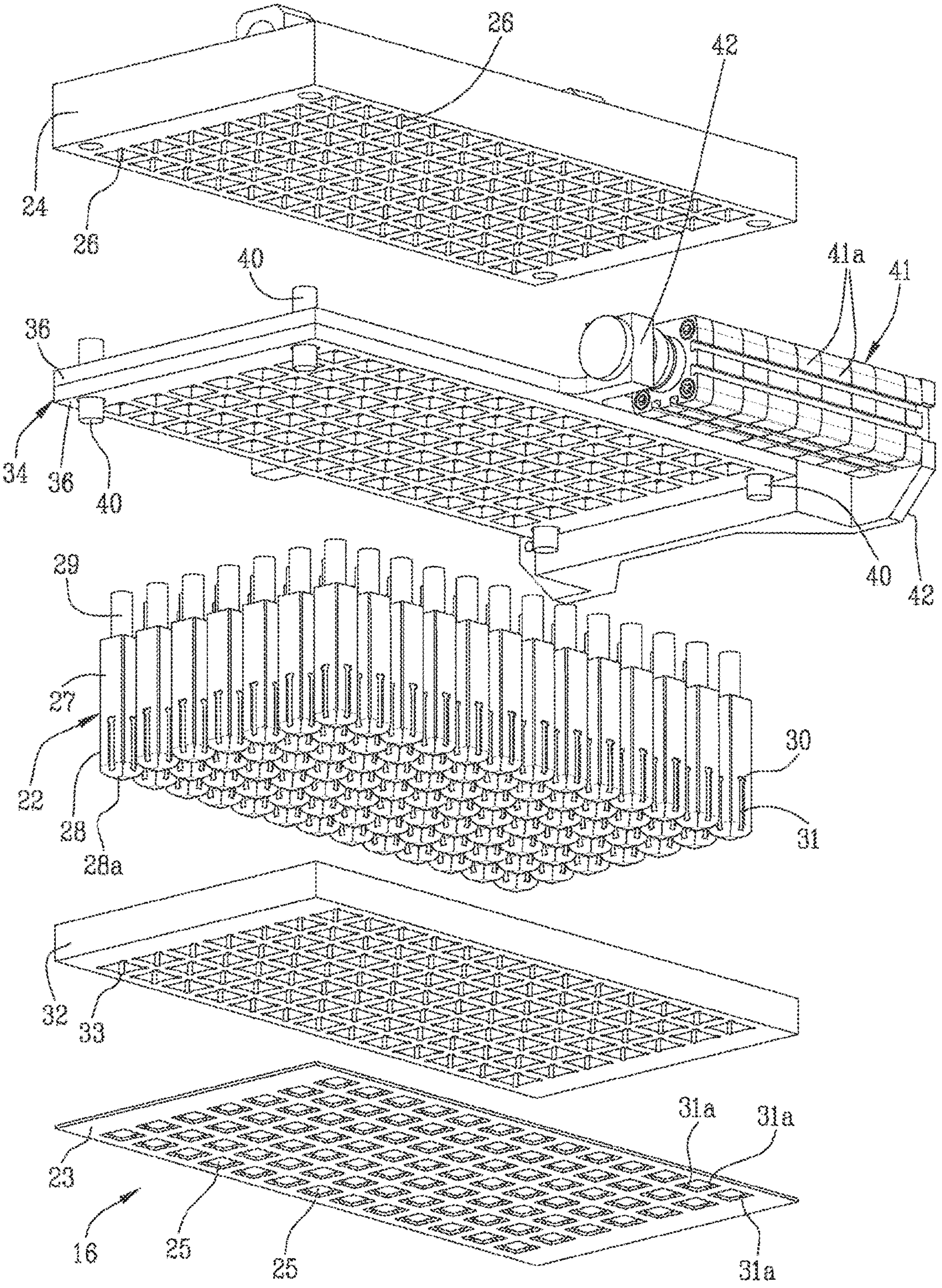
FIG. 2 is an exploded perspective view of one of the gripping elements of the apparatus.

Preferably, as is more visible in FIG. 2, the plate-like body 21 of each gripping element 16 comprises a first plate 23 and a second plate 24 superimposed parallel to each other. The first plate 23, directed towards the central axis X, carries a plurality of through holes 25 while the second plate 24 has sliding seats 26 each aligned with one of the through holes 25 of the first plate 23.

Each of the feeler pins 22, having elongated shape along a respective radial movement direction, is slidably engaged through the first plate 23 and the second plate 24.

More particularly, each feeler pin 22 has a proximal portion 27 slidably guided along one of the sliding seats 26 carried by the second plate 24, according to a sliding direction parallel to the radial approach direction of the gripping element 16 with respect to the central axis X. From the proximal portion 27, a distal portion 28 is extended which slidably crosses one of the through holes 25 of the first plate 23, so as to project in radially inner position from the plate-like body 21, with their own distal end 28*a* directed in the direction of the central axis X.

At least one return spring 29 or elastic elements of another type preferably operate within each of the sliding seats 26, for elastically pushing each feeler pin 22 towards the respective extracted position.

Preferably, each feeler pin 22 has at least one abutment shoulder 30 which, in the illustrated example, delimits the distal portion 28 from the proximal portion 27. The abutment shoulder 30 is adapted to act against one edge of the respective through hole 25, in order to stop the travel of the feeler pin 22 by opposing the thrust action of the return spring 29 upon reaching the extracted position.

In the illustrated example, the abutment shoulders 30 are defined at the ends of respective grooves 31 made longitudinally on one or more side of the distal portion 28 of each feeler pin 22. Each of the grooves 31 engages a perimeter projection 31*a* arranged on the edge of the respective through hole 25 arranged in the first plate 23.

The first plate 23 can be made in the form of a thin plate, and preferably coupled to mate with an intermediate plate 32 operatively arranged between the first plate 23 and the second plate 24. The guide function of the feeler pins 22 through each plate-like body 21 can be at least partially entrusted also to guide channels 33 obtained through the intermediate plate 32 and each slidably crossed by one of the feeler pins themselves. Provision is also made such that between each of the plate-like bodies 21 and the respective feeler pins 22 at least one brake 34 is operatively arranged, preferably free transversely to a radial direction, selectively activatable in order to lock the feeler pins 22 themselves in any one intermediate working position between the extracted position and the retracted position.

Figure 3:
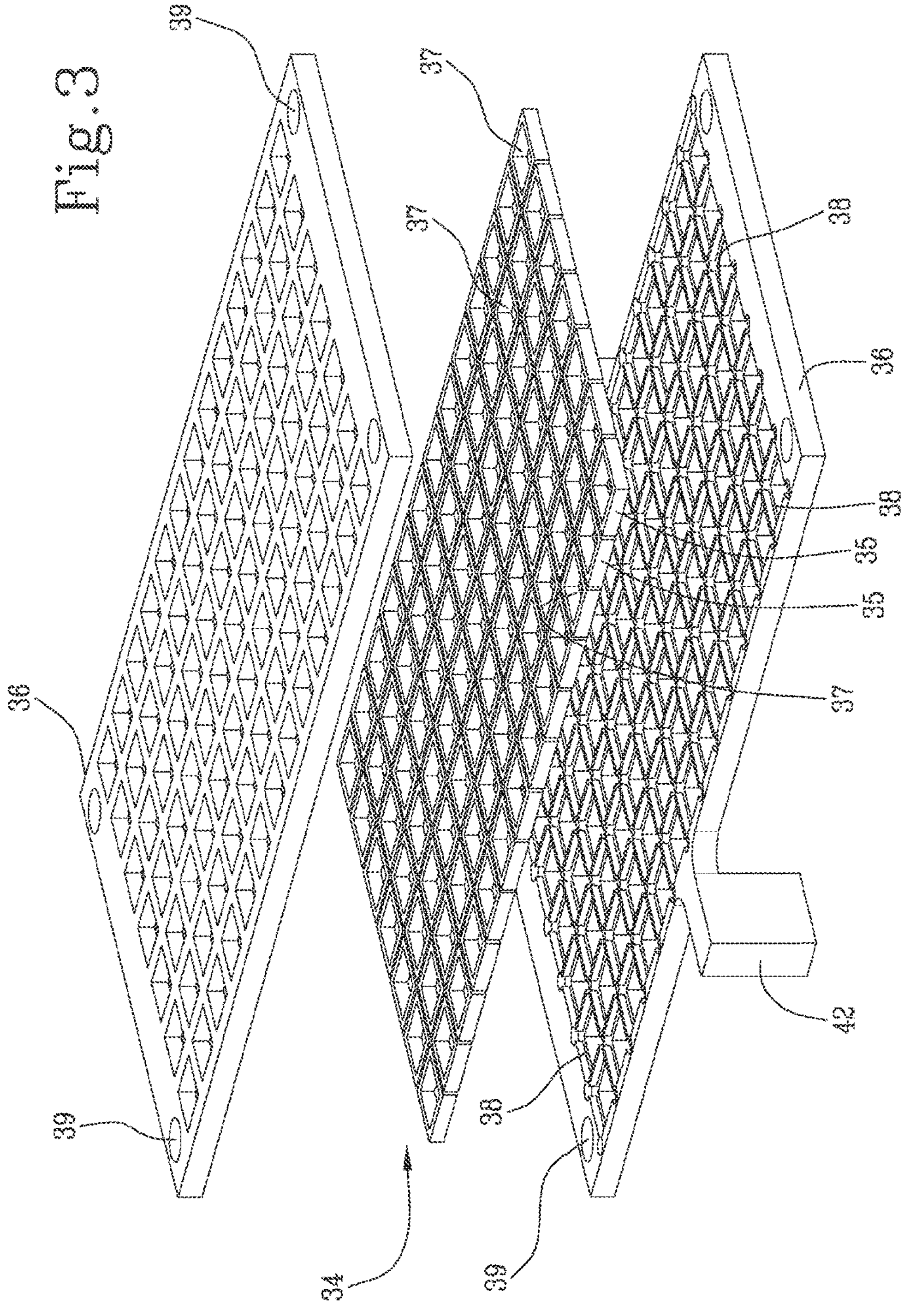
FIG. 3 is an exploded perspective view of a detail of FIG. 2, showing several components of the brake.

As better visible in FIG. 3, the brake 34 comprises one or more brake inserts 35, preferably made of elastomeric material with high friction coefficient, activatable in thrusting relation against each of the feeler pins 22.

Preferably, the brake inserts 35 are fixed to one or more actuation plates 36 and each have a through opening 37 circumscribing at least one of the feeler pins 22 which crosses the same brake insert 35 and actuation plates 36. More particularly, two actuation plates 36 are preferably provided, mutually adjacent to each other and slidably engaged between the intermediate plate 32 and the second plate 24.

On the mutually facing surfaces of the actuation plates 36, containment seats 38 are made, and one of the brake inserts is inserted in each of these. Each of the containment seats 38 preferably has a shaping complementary to that of the respective brake insert 35, so as to perimetrically contain it substantially without mechanical clearance.

The actuation plates 36 have guide slots 39 crossed by centring pins 40 fixed with respect to the first plate 23 and to the second plate 24, as well as to the intermediate plate 32. The actuation plates 36 are mutually slidable along the extension direction of the guide slots 39, and movable in respectively opposite directions to push and compress the brake inserts 35 against the feeler pins 22, transverse to the sliding direction of the latter with respect to the gripping element 16.

The activation of the actuation plates 36 can be obtained upon command of at least one thrust actuator 41 operating between thrust flanges 42 perimetrically thrusting from each of the actuation plates 36. The thrust actuator 41 can conveniently comprise a plurality of fluid-dynamic cylinders 41*a* interconnected in series one after the other so as to develop high thrust actions without requiring actuators with large diameter and/or high supply pressures.

In accordance with a gripping method according to the present invention, the use of the gripping apparatus provides that, with a translation along the linear guides 15, the support structure 12 is positioned circumferentially around an annular component of a tyre 2 which, in the example described herein, is represented by the crown structure 11. The crown structure 11 can be supported by the auxiliary drum 10 on which it was previously attained, and is adapted to be removed therefrom in order to be transferred to the assembly station for the purposes of its coupling with the carcass sleeve.

The annular body 14 of the support structure 12, arranged with the gripping elements 16 in release position, translates coaxially with respect to the auxiliary drum 10 and is stopped in axially centred position around the crown structure 11.

With an angular rotation imposed on the toothed ring nut 17, the simultaneous translation of the gripping elements 16 towards the central axis X is thus driven, bringing the crown structure 11 close to the feeler pins 22 retained in the extracted position due to the return springs 29.

When the distal ends 28*a* of the feeler pins 22 come into contact on the outer surface of the crown structure 11, the radial approaching of the gripping elements 16 to the central axis X can conveniently proceed without interruptions. Since the brakes associated with the gripping elements 16 are deactivated, the gripping elements 16 are free to slide along the feeler pins 22 which came into contact with the crown structure 11, overcoming the resistance of the return springs 29 and continuing with the further approaching of the possible feeler pins 22 that have not yet reached the outer surface of the crown structure 11. Consequently, all the feeler pins 22 can progressively come into contact with the crown structure 11, being abutted against its outer surface, while the gripping elements 16 continue their approach to the central axis X.

Figure 6:
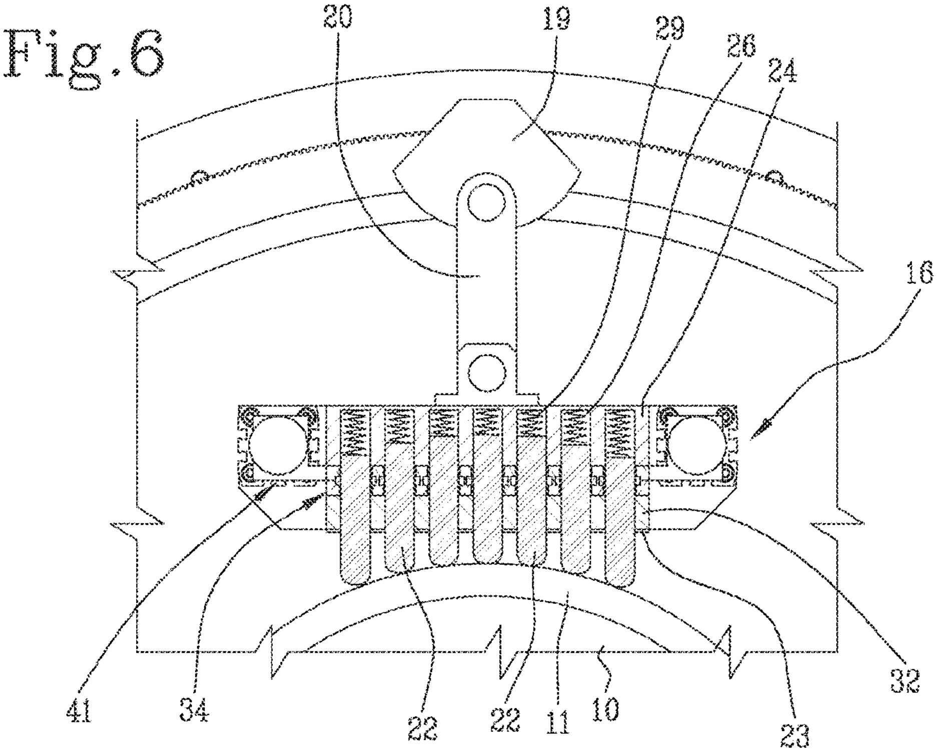
FIG. 6 shows in section one of the gripping elements of FIG. 4, arranged in gripping position on the crown structure.

When the gripping elements 16 reach the gripping position, all the feeler pins 22 can therefore be in contact with the crown structure 11, accurately copying the shaping of the outer surface. The activation of the thrust actuators 41 can then be driven, upon action of which the actuation plates 36 are thrust in respectively opposite directions, carrying the brake inserts 35 to exert opposite forces against the respective feeler pins 22. Due to the consequent friction generated by the brake inserts 35 thrust against the feeler pins 22, the latter remain suitably locked with respect to the gripping elements 16, each distal end 28*a* abutted against the crown structure 11, in the position assumed upon reaching the gripping position as in FIG. 6.

Once the locking of the feeler pins 22 is executed with respect to the gripping elements 16, the auxiliary drum 10 is adapted to be removed from the crown structure 11, for example by radial contraction of the drum itself and subsequent axial removal. The action of abutment exerted by the feeler pins 22 on the outer surface of the crown structure 11 causes a suitable radial containment thereof and support in the absence of stresses and twisting, notwithstanding the absence of the support offered by the auxiliary drum 10 which was removed. The possible presence of magnets (not illustrated), each operatively associated at the distal end 28*a* of a respective feeler pin 22, determines a retention of the crown structure 11 against the feeler pins 22 themselves, opposing undesired collapses thereof due to the weight, facilitating the action of support if the same crown structure 11 or other annular component has metal inserts or inserts made of another ferromagnetic material. Once removed the auxiliary drum 10, the crown structure 11 retained by the gripping elements 16 can be transferred into the assembly station for the purpose of coupling with the carcass sleeve. During coupling, the presence of the feeler pins 22 in contact with the crown structure 11 offers a suitable action of containment and contrast against possible thrust actions exerted radially towards the exterior of the carcass sleeve during shaping.

It may be requested that after the removal of the auxiliary drum 10 (or support drum of another type), the crown structure 11 (or another annular component of the tyre 2) is subjected to further processing steps. For example, the processing of the crown structure 11 can require a shaping treatment aimed to impose on the same a desired cross sectional profile, different from that obtained during the attainment on the auxiliary drum 10, before carrying out the coupling thereof with the carcass sleeve.

In this regard, in accordance with a possible embodiment variant of the invention, after the removal of the auxiliary drum 10 (or other support drum) from the crown structure 11, provision can be made that in the latter (or other annular component of the tyre 2), an additional drum 43 (FIGS. 8 and 9) is coaxially inserted, having a cross sectional profile different from that of the auxiliary drum 10 used above. For example, the additional drum 43 can have a convex cross sectional profile at the radially outer surface thereof, unlike the auxiliary drum 10 in which such cross sectional profile is typically rectilinear.

The engagement of the additional drum 43 can occur by axial movement of the same along the central axis X, or by axial movement of the support structure 12 along the linear guides 15.

Figure 8:
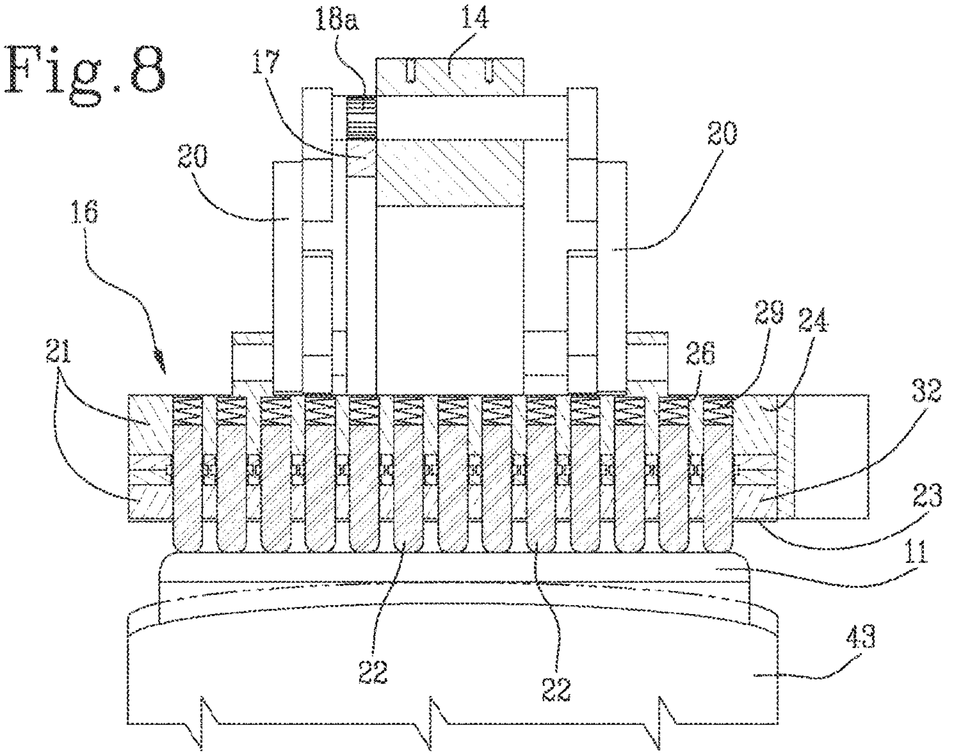
FIG. 8 shows in longitudinal section the apparatus with an additional drum inserted within the belt structure retained by the gripping elements.
Figure 9:
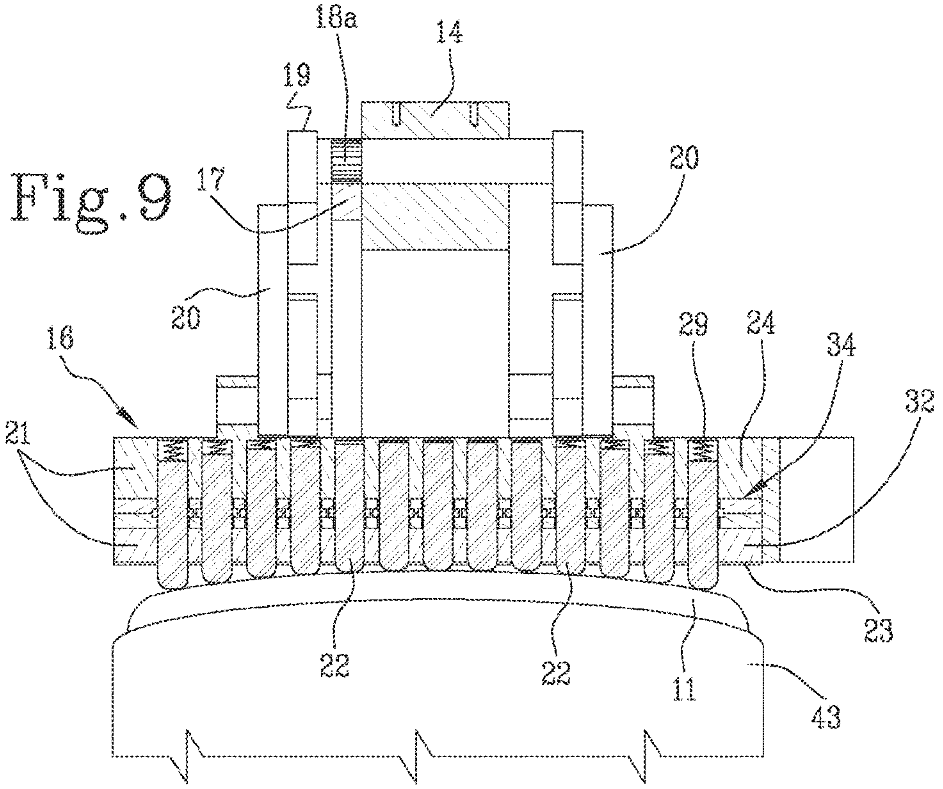
FIG. 9 is a representation similar to FIG. 8, where the additional drum is expanded against the belt structure in order to shape it according to a curved profile.

Upon completed insertion, a preliminary radial expansion of the additional drum 43 can be actuated up to bringing the outer surface thereof in contact with the inner surface of the crown structure 11, as indicated with a dashed line in FIG. 8. The thrust actuators 41 can then be deactivated thus to release the feeler pins 22 with respect to the gripping elements 16, after which the additional drum 43 is adapted to be further expanded within the crown structure 11, forcing the same to sustain a radial expansion in order to take on the convex cross sectional profile corresponding to that of the additional drum 43, as in FIG. 9.

The mobility of the feeler pins 22 allows the latter to radially translate with respect to the gripping elements 16, in order to follow the deformations set to the crown structure 11 so as to support the radial expansion during the expansion of the additional drum 43. During this step, the feeler pins 22 can be slightly rubbed. In order to obtain this effect, it is sufficient to reduce the pressure of the cylinders 41*a* which actuate the actuation plates 36 to which the brake inserts 35 are fixed. Upon completed expansion, the thrust actuators 41 can be reactivated in order to again lock the feeler pins 22 with respect to the gripping elements 16.

The additional drum 43 can thus be radially contracted and removed from the crown structure 11, which remains engaged with the gripping apparatus 1 in order to then be coupled to the carcass sleeve as previously described.

The invention claimed is:

1. An apparatus for gripping annular components of tyres for vehicle wheels, comprising:

- a support structure disposed circumferentially around a central axis;
- a plurality of gripping elements carried by the support structure and circumferentially distributed around said central axis;
- wherein the gripping elements are radially movable each between a gripping position in which the gripping element is approached toward the central axis to retain at least one annular component and a release position wherein the gripping element is moved away from central axis for releasing said at least one annular component;
- wherein each gripping element has:
  - a body;
  - a plurality of feeler pins movable radially through the body between an extracted position, wherein the plurality of feeler pins protrude radially towards the central axis and a retracted position, wherein the plurality of feeler pins are retracted away from the central axis;

and at least one brake operating between the body and the plurality of feeler pins, and selectively activatable to lock the plurality of feeler pins in an intermediate working position between the extracted position and the retracted position.

2. The apparatus according to claim 1, wherein each feeler pin has a proximal portion slidably engaged to the body and a distal portion projecting in a radially internal position from the body.

3. The apparatus according to claim 1, wherein the plurality of feeler pins are movable radially with respect to the body independently of each other.

4. The apparatus according to claim 1, wherein the body of each gripping element comprises a first plate and a second plate superimposed parallel to each other.

5. The apparatus according to claim 4, wherein the first plate carries through holes each slidably crossed by one of the plurality of feeler pins.

6. The apparatus according to claim 5, wherein each feeler pin has at least one abutment shoulder acting against an edge of the respective through hole in the extracted position.

7. The apparatus according to claim 4, wherein the second plate has sliding seats each slidably housing a proximal portion of one of the plurality of feeler pins.

8. The apparatus according to claim 4, further comprising an intermediate plate operatively arranged between the first plate and the second plate and having guide channels each slidably crossed by one of said plurality of feeler pins.

9. The apparatus according to claim 1, further comprising elastic elements for elastically pushing each feeler pin towards the respective extracted position.

10. The apparatus according to claim 9, wherein the elastic elements each operate inside one of the sliding seats.

11. The apparatus according to claim 1, wherein the at least one brake comprises one or more braking inserts activatable in thrusting relation against each of the plurality of feeler pins.

12. The apparatus according to claim 11, wherein each braking insert circumscribes at least one of the plurality of feeler pins at a through opening crossed by the at least one feeler pin itself.

13. The apparatus according to claim 11, wherein the one or more braking inserts are fixed to at least one actuation plate movable upon command of at least one thrust actuator to push the one or more braking inserts against the plurality of feeler pins.

14. The apparatus according to claim 13, wherein the body of each gripping element comprises a first plate and a second plate superimposed parallel to each other, and wherein said actuation plates have guide slots crossed by centring pins fixed with respect to the first and second plates.

15. The apparatus according to claim 13, wherein said at least one actuation plate is slidably engaged between the intermediate plate and the second plate.

16. The apparatus according to claim 13, wherein the at least one thrust actuator comprises a plurality of fluid-dynamic cylinders interconnected in series one after an other.

17. The apparatus according to claim 11, comprising two actuation plates mutually adjacent to each other and movable in respectively opposite directions to compress the one or more braking inserts against the plurality of feeler pins.

18. The apparatus according to claim 17, further comprising containment seats obtained on mutually facing surfaces of the actuation plates, wherein each containment seat houses one of the one or more braking inserts.

19. The apparatus according to claim 13, comprising two actuation plates mutually adjacent to each other and movable in respectively opposite directions to compress the one or more braking inserts against the plurality of feeler pins, wherein said at least one thrust actuator operates between thrust flanges carried each by one of the actuation plates, respectively.

20. The apparatus according to claim 1, comprising at least one cam rotatably engaged with the support structure by at least one pin; and at least one drive lever connected to the at least one cam and to at least one of the plurality of gripping elements;

wherein a rotation of the at least one cam causes a radial movement of at least one of the plurality of gripping elements.

* * * * *